United States Patent [19]

Munie

[11] 4,210,166
[45] Jul. 1, 1980

[54] MIXING APPARATUS

[76] Inventor: Julius C. Munie, 73 Wayside Dr., Ferguson, Mo. 63135

[21] Appl. No.: 833,233

[22] Filed: Sep. 14, 1977

[51] Int. Cl.² ............................................. B01F 15/04
[52] U.S. Cl. .................................... 137/271; 137/604; 366/160
[58] Field of Search ............... 366/150, 160, 162, 163; 137/604, 269, 271; 417/151, 198

[56] References Cited

U.S. PATENT DOCUMENTS

| | | | |
|---|---|---|---|
| 2,331,518 | 10/1943 | Trier | 137/1 |
| 3,643,688 | 2/1972 | Meinert | 137/604 |
| 3,799,195 | 3/1974 | Hermans | 137/604 |
| 4,041,981 | 8/1977 | Davis | 137/604 |

Primary Examiner—Robert W. Jenkins
Attorney, Agent, or Firm—Cohn, Powell & Hind

[57] ABSTRACT

This mixing apparatus is for use in incorporating a base material, such as powder, into a liquid carrier material. The mixing apparatus includes a venturi mixing device used in conjunction with a pump which delivers liquid from a container to said device, to draw the powder from another container by venturi action.

The mixing device includes a T-shaped fitting receiving an intake insert for the liquid and an intake insert for the powder into two of its branches, and receiving a discharge insert in the remaining branch. The liquid insert and discharge insert are spaced apart to create a venturi throat inducing powder to flow through the base material insert and through the discharge insert which is configurated to facilitate mixing. The base material insert is removable for replacement with another insert to suit a different base material.

12 Claims, 6 Drawing Figures

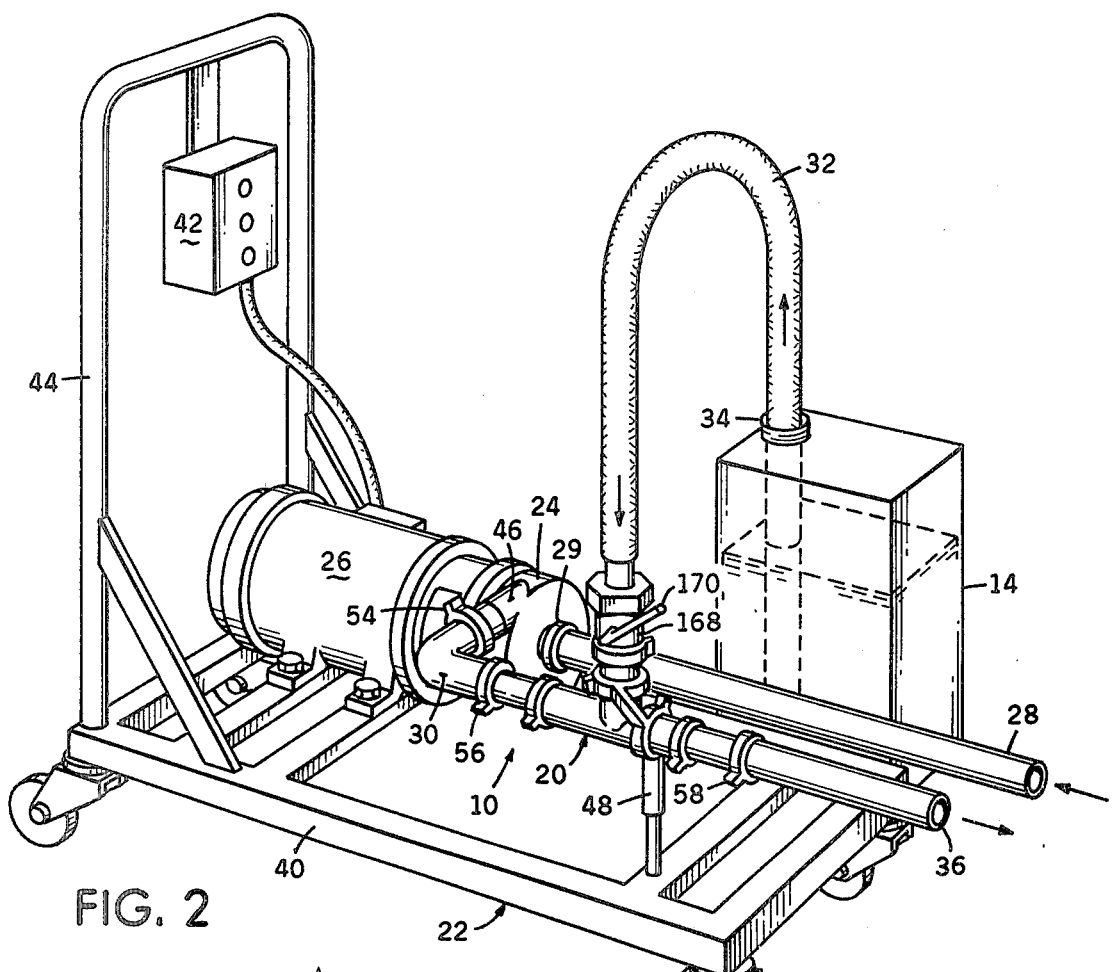
FIG. 2
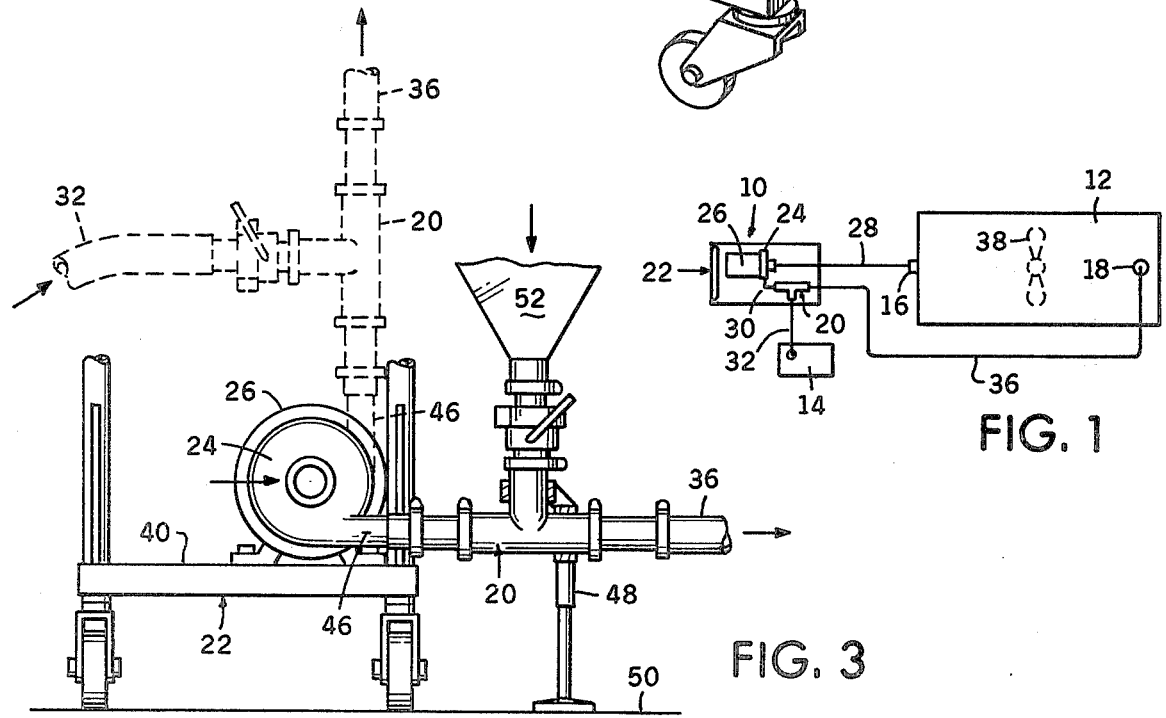
FIG. 3
FIG. 1

MIXING APPARATUS

BACKGROUND OF THE INVENTION

This invention relates generally to a mixing apparatus and particularly to an apparatus which includes venturi device for incorporating powders and high viscosity liquids into liquids having less viscosity.

It is of course recognized that applying the venturi principle to devices for mixing different fluid materials is not in itself new, see for example U.S. Pat. No. 2,331,518 and U.S. Pat. No. 2,785,012. However, the conventional method of mixing powders, such as chocolate powders, into liquids such as milk is by gravity. Essentially, the powder is fed by gravity from a hopper into an open entry of a line circulating between ingress and egress points of a vat. This method presents a dust problem of considerable magnitude. In addition to these problems, such systems frequently suffer from the problem of powder build-up in the line, and because the pumps used are usually of the low pressure type, it takes several hours to mix, for example, three drums (165 pounds) of chocolate powder into a 2500 gal. vat of milk. Systems using high pressure pumps are known in which a "push-pull" system pump arrangement is utilized. Such systems have high energy consumption and one known system requires a 10HP pump on the "push" side of the hopper and a 3HP pump on the "pull" or discharge side of the hopper.

The present system solves these and other problems in a manner not disclosed in the known prior art.

SUMMARY OF THE INVENTION

This mixing apparatus provides a means of mixing a powdered or high viscosity base material into a liquid carrier material and substantially eliminates dust problems. The system utilizes a centrifugal pump and venturi feed rather than gravity feed. The configuration of the venturi mixing device used in the apparatus essentially eliminates powder build-up in the line and provides extremely rapid and efficient mixing.

The mixing apparatus is used in conjunction with a first container for the carrier material and a second container for the base material. Conduits are provided for circulating the carrier material from the first container and through the mixing device; for delivering the base material from the second container and for discharging mixed material from the mixing device.

The venturi mixing device includes a hollow, T-shaped section providing first, second and third branches slidingly receiving a carrier material intake insert; a base material intake insert and a discharge insert respectively, said carrier material intake insert and said base material intake insert being spaced apart within the hollow section to define a venturi throat creating a vacuum drawing base material through the base material intake insert from the second container.

The carrier material intake insert and the discharge insert each include an inner portion received within the associated T-section branch, and an outer handgrip portion connected to said associated branch, and the passage through the carrier material insert is substantially smaller in diameter at the venturi throat than the diameter of the passage of the discharge insert at said throat.

The discharge insert passage is configured to include an upstream converging portion and a downstream diverging portion to facilitate the mixing process.

The base material insert is provided with a longitudinal axis substantially intersecting the venturi throat and said insert is removable for replacement by an insert configured to suit a different base material.

A control valve is provided in the conduit between the base material container and the base material intake insert.

This mixing device is relatively simple and inexpensive to manufacture and can be used by an operator with a relatively small amount of training.

BRIEF DESCRIPTION OF THE DRAWING

FIG. 1 is a schematic illustrating the mixing apparatus used in a circulating mixing operation;

FIG. 2 is a perspective view showing the mixing apparatus mounted to a trolley;

FIG. 3 is a fragmentary end view of the apparatus showing different pump positions;

DESCRIPTION OF THE PREFERRED EMBODIMENT

Figure 5:
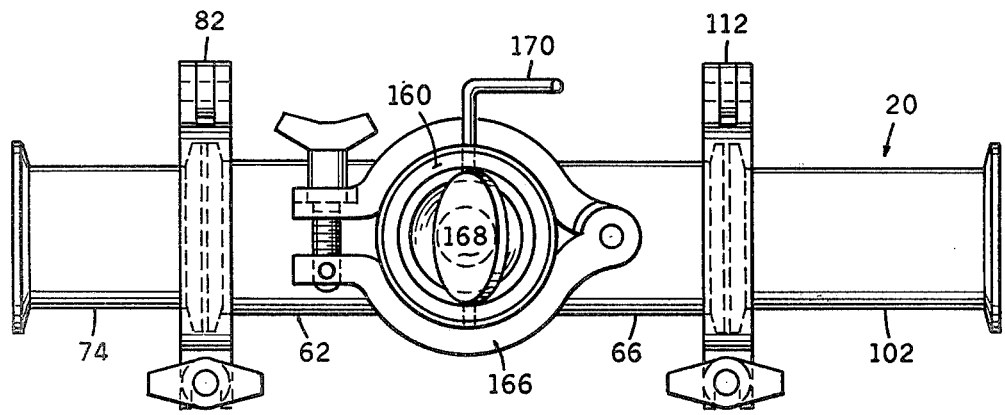
FIG. 5 is a plan view of said mixing device.

Referring now by characters of reference to the drawings and first to FIG. 1 it will be understood that in the schematic arrangement shown, the mixing apparatus 10 is used for the purpose of incorporating a base material, such as chocolate powder contained in a drum 14, into a carrier material, such as milk contained in a vat 12, said vat and drum constituting first and second container means respectively.

The vat 12 includes an outlet port 16 controlled by a cut-off valve (not shown) and in inlet port 18. The mixing apparatus 10 includes a venturi mixing devide 20 which is, in the preferred embodiment, mounted on a trolley 22, and a centrifugal pump 24 powered by a motor 26. Carrier material is circulated through the vat 12 and the mixing device 20 by a conduit means which includes a first portion consisting of an elongate hose 28 and an elbow 30 connecting the vat 12 to the mixing device 20 through the pump 24. The conduit means also includes a flexible hose 32, constituting a second portion, which is received within the drum opening 34 and extends between the drum 14 and the mixing device 20. In the embodiment shown the carrier material is circulated continuously and an elongate hose 36 extends between the mixing device 20 and the inlet port 18 of the vat 12 for this purpose, said hose constituting a third portion of the conduit means. However, the mixing apparatus 10 is readily adaptable for the mixing of materials which do not require circulation through the vat 12 but may be supplied directly, fully mixed into suitable containers (not shown). When the circulation process is used the vat 12 preferably includes an agitator in the form of a paddle 38 and the carrier material is circulated continuously through the vat 12 and the mixing device 20 until a sufficient quantity of base material is incorporated into the carrier material to produce a satisfactory consistency of the mixed material.

Figure 6:
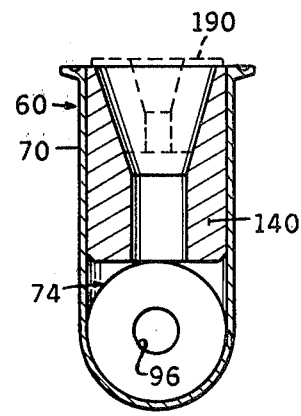
FIG. 6 is a cross-sectional view taken on line 6—6 of FIG. 5.

As shown in FIG. 2, the motor 26 is mounted to the trolley base 40 and is provided with a starting box 42 mounted to the trolley end frame 44. The hose 28 is attached to the pump 24 by means of a conventional fitting 29 and the centrifugal pump 24 is adjustably mounted to the motor 26 so that it can be disposed in various angularly related positions. In FIG. 2, the pump outlet port 46 is disposed in an upper horizontal position in which the mixing device is held in place by an adjustable brace 48 supported on the trolley base 40. FIG. 3 illustrates the versatility of the structural arrangement of parts of the mixing apparatus 10 by showing the pump outlet port 46 disposed in a lower horizontal position in which the mixing device is held in position by the adjustable brace 48 supported directly by the floor 50. In this position the mixing device 20 is disposed to one side of the trolley 22 and is more readily accessible to receive a supply of base material from a hopper 52 rather than from the hose 32. FIG. 3 also shows, in broken outline, the pump outlet 46 disposed in a vertical position. In this position the mixed material can readily be discharged by the hose 36 to a point disposed at a considerable elevation above the mixing device. Thus, the hose 36, which discharges mixed carrier and base material, can be oriented longitudinally, transversely or vertically. In the embodiments shown in FIG. 3, the elbow 30 is dispensed with and, by virtue of the use of conventional hinged clamps 54 and 56, the elbow 30 can quickly be removed and the mixing device 20 attached directly to the centrifugal pump outlet port 46. The hose 36 which is attached to the mixing device 20 by means of clamp 58 is unaffected. The mixing device 20 will now be described with particular reference to FIGS. 4, 5 and 6.

Figure 4:
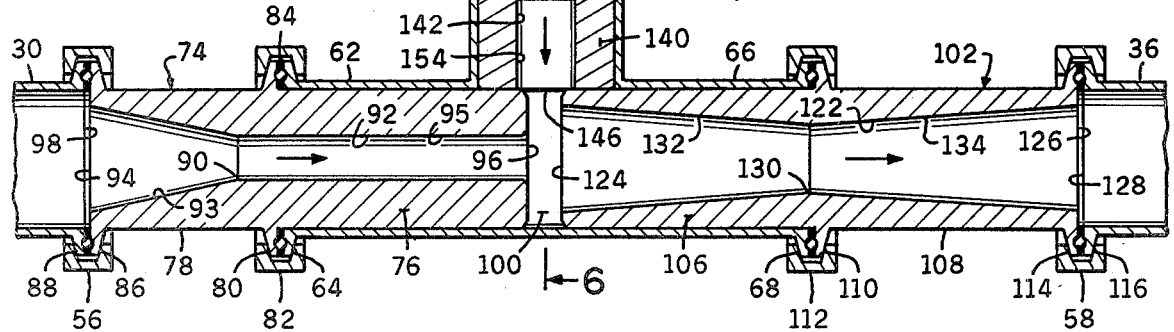
FIG. 4 is a longitudinal cross-sectional view of the venturi mixing device.

As shown particularly in FIG. 4, the mixing device 20 includes a T-fitting 60 which constitutes a hollow section and includes a first arm 62 having an end flange 64, a third arm 66 having an end flange 68 and a second, intermediate arm 70 having a end flange 72, disposed between said first and third arms. The first arm 62 is adapted to receive an intake insert 74 which includes an inner portion 76 slidingly received within the T-section first arm 62 and an outer handgrip portion 78 connectable to the elbow 30. The intake insert 74 includes an intermediate stop flange 80 adapted for connection to the first arm flange 64 by means of a conventional hinged clamp generally indicated by numeral 82, a conventional seal 84 being provided between said two flanges in the conventional manner. At its outer end the intake insert 74 includes an end flange 86 adapted for connection to a similar flange 88 provided on the elbow 30 which is connected to said hose by means of the clamp 56. The intake insert 74 includes an elongate passage 92 extending therethrough which is defined by an inlet orifice 94, an outlet orifice 96 and an intermediate point 90. The inlet orifice 94 communicates directly with the outlet port 98 of the elbow 30 and the passage 92 includes an outer portion 93 convergent from the inlet orifice 94 to the intermediate point 90 and an inner portion 95 extending from the intermediate point 90 to the outlet orifice 96, said inner portion 95 communicating with the interior of the T-section at a point generally indicated by numeral 100 and constituting a venturi throat.

The carrier material passes through the venturi throat 100 into a discharge insert 102 which is spaced from said intake insert 74. Because of the venturi action a vacuum is formed as the carrier material passes through the throat which results in base material being drawn from the drum 14 by way of the hose 32 and a base material intake insert generally indicated by numeral 140.

The discharge insert 102 includes an inner portion 106 slidingly received within the T-section third arm 66 and an outer handgrip portion 108 which includes an intermediate stop flange 110 adapted for connection to the T-section first arm flange 68 by means of a hinged clamp 112. The outer portion 108 also includes an end flange 114 which is attached to the corresponding flange 116 of the hose 36 by means of clamp 58. The discharge insert 102 includes a passage 122 extending therethrough which is defined by an inlet orifice 124, an outlet orifice 126 and an intermediate point 130. The outlet orifice 126 communicates directly with the inlet port 128 of the hose 36 and the passage 122 includes an inner portion 132 which is convergent from the inlet orifice 124 to the intermediate point 130, and an outer portion 134 which is divergent from said intermediate point 130 to the outlet orifice 126.

The base material intake insert 140 is substantially cylindrical and is received in sliding relation within the T-section second arm 70. In the embodiment shown the insert 140 rests on the inner ends of the intake and discharge inserts 74 and 102. However, if desired an annular lip, or other retaining means, engaging a corresponding portion of the arm 70 can be provided as a stop means to predetermine the extent to which the insert 120 is received within said arm. The insert 140 includes a passage 142 extending therethrough which is defined by an inlet orifice 144, an outlet orifice 146 and an intermediate point 148. The passage 142 includes an outer portion 152 convergent from the inlet orifice 144 to the intermediate point 148 and an inner portion 154 of substantially uniform diameter extending from said intermediate point 148 to the outlet orifice 146 in communicating relation with the venturi throat 100. The base material insert 140 is replaceable by other inserts specifically adapted to suit particular materials requiring a different passage size. In addition, as clearly shown in FIG. 6 a sub-insert, indicated by numeral 190 in broken outline, can be inserted within insert 140 to vary the size and configuration of the passage conveying base material to the venturi throat 100.

In the embodiment shown a control valve 160 is disposed between the hose 32 and the base material intake insert 140. The control valve 160 includes a threaded upper end 162 and is provided with a flange 164 at the lower end which is connected to the corresponding flange 72 on the T-section second arm 70 by means of a hinged clamp 166. In the preferred embodiment the control valve 160 is a butterfly valve which includes a movable element 168 actuated between open and closed positions by means of a manually operated handle 170. The hose 32 is fitted with an end adaptor generally indicated by numeral 172 which includes a sealed annular base portion 174 defining an outlet port 176 which communicates with the base material insert inlet orifice 144 through the medium of the control valve 160. The adaptor 172 is provided with a nut 178, which is connected to the threaded upper end 172 of the control valve 160.

It is thought that the structural features and functional advantages of this mixing apparatus 10 and in particular of the mixing device 20 have become fully understood from the foregoing description of parts. However, for completeness of disclosure the operation will be briefly described.

It will be assumed that the materials to be mixed are milk contained in a 2,500 gallon vat 12 and chocolate powder contained in three 55 gallon drums 14 only one of which is shown for convenience. Initially, the intake and discharge inserts 74 and 102 are connected to the T-section 60 by means of clamps 82 and 112 respectively. Following this the trolley 22 is set up as shown in FIGS. 1 and 2 with the elongate hose 28 connected between the vat outlet port 16 and the pump 24 by means of the pump connection 29. The elbow 30 is connected between the pump 24 and the mixing device 20 by means of clamps 54 and 56 and the hose 36 is connected between the vat inlet port 18 and the mixing device 20 by means of clamp 58. Hose 32 is immersed within the chocolate powder contained within the drum 14 and the other end of said hose, including the control valve 160 is connected to the mixing device 20 by clamp 166, after the appropriate base material intake insert 120 has been placed within the T-section 60. In the case of chocolate powder the size of the base material intake insert inlet orifice 144 and outlet orifice 146 are 1⅜ inch diameter and ¾ inch diameter respectively. The carrier material intake insert inlet orifice 94 and outlet orifice 96 are 1 5/16 inch and ½ inch diameter respectively and the discharge insert inlet orifice 124 and outlet orifice 126 are 1 7/16 inch and 1 ⅜ inch diameter respectively, with the juncture at the throat or intermediate portion 130 having a diameter of ⅛ inch. As clearly shown in FIG. 4 the longitudinal axis of the passage portion 154 terminating in the inlet orifice 146 extends through the throat 100 defined by the spacing between the carrier material intake insert 72 and the discharge insert 102.

The outlet port valve (not shown) of the vat 12 is moved into the open position and the pump 24, driven by a 5HP motor 26 in the preferred embodiment, is energized to circulate the liquid through the mixing device 20. With the butterfly control valve 160 in the fully open position a vacuum approaching 30 inches is created at the venturi throat 100 which results in rapid induction of chocolate powder through the 1 inch diameter hose 32. Upon passing into the discharge insert passage 102 the powder and the milk mixture is subjected to turbulence because of the speed change resulting from the convergent/divergent configuration of said passage thereby enhancing the mixing process. The efficiency of the mixing apparatus as a whole is such that complete mixing can be achieved by continuous circulation through the vat 12 in less than 10 minutes.

In most instances in which other materials are to be mixed a different hose and different intake inserts are provided. For example, the mixing of relatively viscous base material such as orange juice syrup requires a hose 32 increased in diameter to 2 inches while the insert 120 is provided with a uniform diameter passage of 1⅛ inches. In order to mix powdered salt with water to produce a brine solution a hose 32 of 1 inch diameter is required in conjunction with an insert 120 having an inlet orifice of 1⅜ inch diameter and an outlet orifice of ½ inch diameter. This arrangement is also suitable for mixing confection sugar with water.

In those instances in which a hopper such as that indicated by numeral 52 in FIG. 3 is to be used to supply the base material into the mixing device 20, the centrifugal pump 24 can be re-oriented to provide ease of access for said hopper. As also shown in FIG. 3, in those instances in which the mix is to be discharged into a higher elevation container, the centrifugal pump 24 is re-oriented to the vertical position shown in broken outline.

I claim as my invention:

1. A mixing device for incorporating base material into a carrier material, the device comprising:
    (a) a substantially hollow section including a first arm, a second arm and a third arm, said second arm being disposed intermediate and communicating with said first and third arms, said first and third arms being coaxially cylindrical and having a smooth inner surface,
    (b) a carrier material intake insert having a smooth cylindrical outer surface slidingly received within said first arm said insert having a substantially unrestricted passage extending therethrough and providing an inlet orifice receiving carrier material and an outlet orifice communicating with the interior of the hollow section,
    (c) a base material intake insert received within said second arm said insert having a passage extending therethrough and providing an inlet orifice receiving base material and an outlet orifice communicating with the interior of the hollow section, and
    (d) a discharge insert having a smooth cylindrical outer surface slidingly received within said third arm said insert having a passage extending therethrough and providing an inlet orifice, communicating with the interior of the hollow section and disposed in spaced relation from the outlet orifice of the carrier material insert and the outlet orifice of the base material insert, and an outlet orifice, said discharge insert and said carrier material insert having stop means engageable with the receiving arms to define a fixed, axially spaced gap between said inserts.

2. A mixing device for incorporating base material into a carrier material, the device comprising:
    (a) a substantially hollow section including a first arm, a second arm and a third arm, said second arm being disposed intermediate and communicating with said first and third arms,
    (b) a carrier material intake insert received within said first arm said insert having a substantially unrestricted passage extending therethrough and providing an inlet orifice receiving carrier material and an outlet orifice communicating with the interior of the hollow section,
    (c) a base material intake insert received within said second arm said insert having a passage extending therethrough and providing an inlet orifice receiving base material and an outlet orifice communicating with the interior of the hollow section,
    (d) a discharge insert received within said third arm said insert having a passage extending therethrough and providing an inlet orifice, communicating with the interior of the hollow section and disposed in spaced relation from the outlet orifice of the carrier material insert and the outlet orifice of the base material insert, and an outlet orifice, and
    (e) said base material intake insert being slidingly received within said second arm and being interchangeable with a like insert adapted to received a different base material.

3. A mixing device for incorporating base material into a carrier material, the device comprising:
    (a) a substantially hollow section including a first arm, a second arm and a third arm, said second arm being disposed intermediate and communicating with said first and third arms,
    (b) a carrier material intake insert received within said first arm said insert having a substantially unrestricted passage extending therethrough and providing an inlet orifice communicating with the interior of the hollow section,
(c) a base material intake insert received within said second arm said insert having a passage extending therethrough and providing an inlet orifice receiving base material and an outlet orifice communicating with the interior of the hollow section,
(d) a discharge insert received within said third arm said insert having a passage extending therethrough and providing an inlet orifice, communicating with the interior of the hollow section and disposed in spaced relation from the outlet orifice of the carrier material insert and the outlet orifice of the base material insert, and an outlet orifice, and
(e) the passage through the discharge insert including an inner portion converging from the inlet orifice and an outer portion diverging to the outlet orifice, said portions having converging and diverging lengths together equal to at least the greater portion of the length of the passage.

4. A mixing device for incorporating base material into a carrier material, the device comprising:
(a) a substantially hollow section including a first arm, a second arm and a third arm, said second arm being disposed intermediate and communicating with said first and third arm,
(b) a carrier material intake insert received within said first arm said insert having a substantially unrestricted passage extending therethrough and providing an inlet orifice communicating with the interior of the hollow section,
(c) a base material intake insert received within said second arm said insert having a passage extending therethrough and providing an inlet orifice receiving base material and an outlet orifice communicating with the interior of the hollow section,
(d) a discharge insert received within said third arm said insert having a passage extending therethrough and providing an inlet orifice, communicating with the interior of the hollow section and disposed in spaced relation from the outlet orifice of the carrier material insert and the outlet orifice of the base material insert, and an outlet orifice, and
(e) the outlet orifice of the carrier material intake insert being of substantially smaller maximum diameter than the inlet orifice of the discharge insert, and
(f) the space between the carrier material intake insert outlet orifice and the discharge insert inlet orifice defining a venturi throat.

5. A mixing device for incorporating base material into a carrier material, the device comprising:
(a) a substantially hollow section including a first arm, a second arm and a third arm, said second arm being disposed intermediate and communicating with said first and third arms,
(b) a carrier material intake insert received within said first arm said insert having a passage extending therethrough and providing an inlet orifice receiving carrier material and an outlet orifice communicating with the interior of the hollow section,
(c) a base material intake insert received within said second arm said insert having a passage extending therethrough and providing an inlet orifice receiving base material and an outlet orifice communicating with the interior of the hollow section,
(d) a discharge insert received within said third arm said insert having a passage extending therethrough and providing an inlet orifice, communicating with the interior of the hollow section and disposed in spaced relation from the outlet orifice of the carrier material insert and the outlet orifice of the base material insert, and an outlet orifice,
(e) the space between the carrier material intake insert outlet orifice and the discharge insert inlet orifice defining a venturi throat, and
(f) the passage through the base material intake insert having an outlet orifice with a flow axis disposed between the outlet orifice of the carrier material intake insert and the inlet orifice of the discharge insert.

6. A mixing device for incorporating base material into a carrier material, the device comprising:
(a) a substantially hollow section including a first arm, a second arm and a third arm, said second arm being disposed intermediate and communicating with said first and third arm,
(b) a carrier material intake insert received within said first arm said insert having a substantially unrestricted passage extending therethrough and providing an inlet orifice communicating with the interior of the hollow section,
(c) a base material intake insert received within said second arm said insert having a passage extending therethrough and providing an inlet orifice receiving base material and an outlet orifice communicating with the interior of the hollow section,
(d) a discharge insert received within said third arm said insert having a passage extending therethrough and providing an inlet orifice, communicating with the interior of the hollow section and disposed in spaced relation from the outlet orifice of the carrier material insert and the outlet orifice of the base material insert, and an outlet orifice, and
(e) the passage through the base material insert including a portion converging from the inlet orifice toward, and coaxial with, the outlet orifice.

7. A mixing device for incorporating base material into a carrier material, the device comprising:
(a) a substantially hollow section including a first arm, a second arm and a third arm, said second arm being disposed intermediate and communicating with said first and third arm,
(b) a carrier material intake insert received within said first arm said insert having a substantially unrestricted passage extending therethrough and providing an inlet orifice communicating with the interior of the hollow section,
(c) a base material intake insert received within said second arm said insert having a passage extending therethrough and providing an inlet orifice receiving base material and an outlet orifice communicating with the interior of the hollow section,
(d) a discharge insert received within said third arm said insert having a passage extending therethrough and providing an inlet orifice, communicating with the interior of the hollow section and disposed in spaced relation from the outlet orifice of the carrier material insert and the outlet orifice of the base material insert, and an outlet orifice,
(e) said carrier material intake insert including an inner portion received in sliding relation within said first arm and an outer longitudinally aligned handgrip portion having stop means operatively engageable with said first arm to predetermine the location of the outlet orifice thereof within the hollow section, and (f) said discharge insert including an inner portion received in sliding relation within said third arm and an outer longitudinally aligned handgrip portion having stop means operatively engageable with said third arm to predetermine the location of the inlet orifice thereof within the hollow section.

8. A mixing device as defined in claim 7, in which:

(g) manual, variable control valve means is connected to the second arm outwardly of the base material intake insert to vary and control flow through said insert.

9. In a mixing apparatus for incorporating base material into a carrier material:

(a) first container means for the carrier material including an outlet opening and an inlet opening, (b) second container means for base material, including an outlet opening, (c) conduit means including:
  (1) a first portion having an inlet port and an outlet port, said inlet port being operatively connected to the outlet opening of said first container,
  (2) a second portion having an inlet port and an outlet port said inlet port being operatively connected to the outlet opening of the second container, and
  (3) a third portion having an inlet port and an outlet port, said outlet port being operatively connected to the inlet opening of the first container (d) pump means disposed in one of said first and third portions of the conduit means, (e) a mixing device including:
  (1) a substantially hollow section including a first arm, a second arm and a third arm said second arm being disposed intermediate and communicating with said first and third arms,
  (2) a carrier material intake insert received within said first arm, said insert having a passage extending therethrough providing an inlet orifice operatively connected to the outlet port of the first portion of the conduit means and an outlet orifice communicating with the interior of the hollow section,
  (3) a base material intake insert received within said second arm, said insert having a passage extending therethrough providing an inlet orifice operatively connected to the outlet port of the second portion of the conduit means and an outlet orifice communicating with the interior of the hollow section, and
  (4) a discharge insert received within said third arm, said insert having a passage extending therethrough and providing an inlet orifice communicating with the interior of the hollow section and disposed in spaced relation from the outlet orifice of the carrier material insert and an outlet orifice connected to the inlet port of the third portion of the conduit means.

10. A mixing device as defined in claim 9, in which:

(f) a manual flow control valve is disposed in said second portion of the conduit means to control flow through the base material insert.

11. In a mixing apparatus for incorporating base material into a carrier material:

(a) first container means for the carrier material including an outlet opening, (b) second container means for base material, including an outlet opening, (c) conduit means including:
  (1) a first portion having an inlet port and an outlet port, said inlet port being operatively connected to the outlet opening of said first container,
  (2) a second portion having an inlet port and an outlet port, said outlet port being operatively connected to the outlet opening of the second container, and
  (3) a third portion having an inlet port and an outlet port, (d) pump means disposed in one of said first and third portions of the conduit means, (e) a mixing device including:
  (1) a substantially hollow section including a first arm, a second arm and a third arm said second arm being disposed intermediate and communicating with said first and third arms,
  (2) a carrier material intake insert received within said first arm, said insert having a passage extending therethrough providing an inlet orifice operatively connected to the outlet port of the first portion of the conduit means and an outlet orifice communicating with the interior of the hollow section,
  (3) a base material intake insert received within said second arm, said insert having a passage extending therethrough providing an inlet orifice operatively connected to the outlet port of the second portion of the conduit means and an outlet orifice communicating with the interior of the hollow section, and
  (4) a discharge insert received within said third arm, said insert having a passage extending therethrough and providing an inlet orifice communicating with the interior of the hollow section and disposed in spaced relation from the outlet orifice of the carrier material insert and an outlet orifice connected to the inlet port of the third portion of the conduit means, (f) the pump means and the mixing device being mounted to a trolley, and (g) the pump means being a centrifugal pump disposed in the first conduit portion and having an outlet port said pump being rotatable relative to the trolley to selectively determine the orientation of said outlet port.

12. A mixing device for incorporating base material into a carrier material, the device comprising:

(a) a substantially hollow section including a first arm, a second arm and a third arm, said second arm being disposed intermediate and communicating with said first and third arms, said first and third arms being coaxially cylindrical and having a smooth inner surface, (b) a carrier material intake insert having a smooth cylindrical outer surface slidingly received within said first arm said insert having a substantially unrestricted passage extending therethrough and providing an inlet orifice receiving carrier material and an outlet orifice communicating with the interior of the hollow section, (c) said second arm having a passage extending therethrough and providing an inlet orifice receiving base material and an outlet orifice communicating with the interior of the hollow section, and (d) a discharge insert having a smooth cylindrical outer surface slidingly received within said third arm said insert having a passage extending therethrough and providing an inlet orifice, communicating with the interior of the hollow section and disposed in spaced relation from the outlet orifice of the carrier material insert and the outlet orifice of the base material passage, and an outlet orifice, said discharge insert and said carrier material insert having stop means engageable with the receiving arms to define a fixed, axially spaced gap between said inserts.

* * * * *